United States Patent
Miwa et al.

[11] Patent Number: 5,224,782
[45] Date of Patent: Jul. 6, 1993

[54] HYDRODYNAMIC BEARING

[75] Inventors: Sachihiko Miwa, Saitama; Manabu Toshimitsu, Kanagawa; Kazuyuki Kasahara, Kanagawa; Yoshikazu Suganuma, Kanagawa; Yumiko Noda, Kanagawa, all of Japan

[73] Assignee: Ebara Corporation, Tokyo, Japan

[21] Appl. No.: 852,146

[22] PCT Filed: Oct. 25, 1991

[86] PCT No.: PCT/JP91/01462
§ 371 Date: Apr. 30, 1992
§ 102(e) Date: Apr. 30, 1992

[87] PCT Pub. No.: WO92/08062
PCT Pub. Date: May 14, 1992

[30] Foreign Application Priority Data
Oct. 25, 1990 [JP] Japan .................... 2-287690

[51] Int. Cl.⁵ ............................................. F16C 32/06
[52] U.S. Cl. ........................... 384/100; 384/907; 384/907.1
[58] Field of Search ............ 384/100, 107, 108, 907, 384/907.1

[56] References Cited

U.S. PATENT DOCUMENTS
| | | | |
|---|---|---|---|
| 4,728,201 | 3/1988 | Abbe | 384/108 X |
| 5,076,716 | 12/1991 | Mizobuchi et al. | 384/907.1 X |
| 5,114,245 | 5/1992 | Tanaka | 384/107 X |
| 5,114,886 | 5/1992 | Tsukada | 384/907.1 X |

FOREIGN PATENT DOCUMENTS
63-72743  2/1988  Japan.
63-57914  12/1988  Japan.
64-65322  10/1989  Japan.

Primary Examiner—Thomas R. Hannon
Attorney, Agent, or Firm—Wenderoth, Lind & Ponack

[57] ABSTRACT

A hydrodynamic bearing for a spindle motor used in an environment of high degree of cleanness. A sliding surface of the hydrodynamic bearing is formed of a ceramic material with a surface roughness Ra not larger than 0.3 microns, and this sliding surface is coated thinly with at least one lubricant selected from among perfluoropolyethers having a functional group reactive with the ceramic material, thereby providing on the sliding surface a uniform thin film with a thickness in the range of from 20 to 100 angstrom and having protecting and lubricating functions. The lubricant is selected from among hydroxyl group-containing perfluoropolyethers, carboxyl group-containing perfluoropolyethers, and ester group-containing. The lubricant contains an antistatic agent.

6 Claims, 6 Drawing Sheets

HYDRODYNAMIC BEARING

TECHNICAL FIELD

The present invention relates to a hydrodynamic bearing for use in a spindle motor and, more particularly, to a hydrodynamic bearing which is usable in an environment where an ordinary lubricant, which is likely to splash, cannot be used.

BACKGROUND ART

Recently, with the achievement of hard disk drives (HDD) with a high storage capacity, bearings of spindle motors which are used therefor have been demanded to enable the motors to rotate with high accuracy and with low power consumption, and employment of hydrodynamic bearings has been proposed. In a hydrodynamic bearing, the sliding surfaces of the bearing are in contact with each other when the motor is started and stopped, so that problems in terms of durability may occur depending on the material of the sliding surfaces, the machined condition thereof or the assembling accuracy. For this reason, the necessity to use a lubricant has been considered.

Generally, lubrication of the area of sliding contact between a shaft and a bearing metal of a hydrodynamic bearing used in a spindle motor for an HDD is effected by using a liquid lubricant, i.e., oil or grease (hereinafter referred to as "oil"), or various kinds of coating.

In a case where the bearing material is an ordinary metallic material, a lubricant film with a thickness in the range of from 0.01 micron to several microns is formed. However, the bonding between the metallic material and the lubricant is weak, so that the lubricant is likely to separate and splash to the outside in the form of an oil mist, thus making adverse effects on the magnetic medium of a hard disk or the like.

In a case where ceramic sliding surfaces that are finished with a surface roughness Ra of 0.2 microns, for example, are each coated with a film of a lubricant which is unlikely to splash to a thickness of 500 Å, for example, the thickness of the film thus formed is likely to be uneven, and it is difficult to control the lubricant film so that the film thickness will be uniform. If the film thickness exceeds 100 Å, a sticking phenomenon based on the meniscus effect of the lubricant occurs, so that the static frictional torque increases. In such a case, the spindle motor may be unable to start. On the other hand, if the lubricant film is excessively thin, the oil will separate during the repeated start and stop of the spindle motor, causing the ceramic sliding surfaces to come into contact with each other. In consequence, wear progresses, causing dust to be generated.

To solve these problems, the following methods have heretofore been proposed: According to one conventional method, the sliding surfaces are coated with a light and soft metal layer, e.g., silver, lead, white metal, etc., as a lubricating layer to prevent seizing by utilization of plastic deformation, shearing and sticking of the soft metal. With this method, dust that is generated from the soft metal as wear progresses forms a considerably large lump, and this dust may leak out or enter the area between the sliding surfaces or fill dynamic pressure generating grooves, thus making it impossible for the device to function as a bearing.

According to another conventional method, the sliding surfaces are coated with a material having self-lubricating properties, e.g., a polymer having lubricating properties, such as molybdenum disulfide, polytetrafluoroethylene, etc., by means, for example, of sputtering (ion plating or vapor deposition).

However, methods that employ a vacuum apparatus, such as a sputtering method, involve problems that the apparatus is complicated and setting of conditions is difficult and that it is impossible to effect uniform coating on the inner peripheral surface. Moreover, the polymer that is provided specially for lubricating purposes may lose its lubricating properties. In addition, as wear progresses, the lubricating layer may break suddenly, resulting in an increase in the coefficient of friction. In such a case, a large torque is needed at the time of starting.

Japanese Patent Public Disclosure No. 64-65322 discloses a hydrodynamic bearing in which at least one of surfaces which rotate face-to-face with each other is coated with either or both an organopolysiloxane having a functional group and a fluorine-containing polymer. In the hydrodynamic bearing disclosed in this publication, the above-described substance reacts with the surface of a metal that constitutes the sliding surface to form a lubricant film. However, since the increase in the degree of machining accuracy of a metal is limited and the surface roughness of a metal is relatively large, the lubricant film formed in the hydrodynamic bearing disclosed in the publication has a multilayer structure undesirably.

DISCLOSURE OF INVENTION

In view of the above-described circumstances, it is an object of the present invention to improve a hydrodynamic bearing used in an environment of high degree of cleanness and to provide a hydrodynamic bearing in which solid members slide relative to each other at the time of start and stop, the bearing being designed so that it is possible to increase the lifetime, improve the performance and minimize the loss of torque at the time of starting.

In the hydrodynamic bearing of the present invention, a sliding surface is formed of a ceramic material with a surface roughness Ra not larger than 0.3 microns, and this sliding surface is coated thinly with at least one lubricant selected from among perfluoropolyethers having a functional group reactive with the ceramic material, thereby providing on the sliding surface a uniform thin film with a thickness in the range of from 20 Å to 100 Å and having protecting and lubricating functions. Preferably, the lubricant contains an antistatic agent.

The hydrodynamic bearing of the present invention is essentially different in the dimensional accuracy from hydrodynamic bearings which are employed for water lubrication in pumps or for rotary portions of machine tools, for example. That is, the hydrodynamic bearing of the present invention is finished so that the flatness, cylindricality and roundness are within several microns. In addition, the hydrodynamic bearing of the present invention is used in a clean environment where no external dust enters.

The hydrodynamic bearing of the present invention does not display its advantageous effects in an environment where external dust, oil or the like may enter.

The ceramic sliding surfaces are preferably finished with a surface roughness Ra not larger than 0.3 microns. Alternatively, the sliding surfaces are formed by sputtering, CVD, ion plating, etc. so that the surface roughness Ra is not larger than 0.3 microns. If the surface roughness Ra exceeds 0.3 microns, the true contact area decreases, resulting in a rise in the surface pressure. In consequence, the thin film becomes likely to separate, so that the hydrodynamic bearing cannot display its advantageous effects.

There are irregularities in the sliding surfaces, and the projections of the irregularities are in contact with each other in actuality. Accordingly, even if the apparent contact area is the same, a larger surface roughness provides a smaller true contact area. As the true contact area decreases, the true surface pressure increases. Therefore, the coated lubricant is likely to separate, and wear progresses. When the surface roughness is small, the contact area increases, so that the action of the lubricant is enhanced. In addition, the surface pressure lowers, and hence the coefficient of friction lowers.

Examples of perfluoropolyether lubricants having a functional group which are usable as a lubricant are hydroxyl group-containing perfluoropolyethers, carboxyl group-containing perfluoropolyethers, ester group-containing perfluoropolyethers, etc. It is possible to use either one selected from among these perfluoropolyether lubricants or a mixture of two or more of them.

The lubricant is coated by a method wherein a bearing member is first degreased and dried thoroughly and then coated with a solution prepared by dissolving a small amount of lubricant in a solvent, e.g., trichlorotrifluoroethane, by spin coating, spray coating, dipping, etc., and then the coated lubricant is heated to form a thin film.

Perfluoropolyether lubricants having a functional group are polymers which have a principal structural unit represented by the general formula $-C_xF_{2x}-O-$ (X is an integer of 1 to 4) and an average molecular weight of 1,000 to 5,000. This portion dominates the lubricating function.

It is preferable to use a perfluoropolyether lubricant which contains a functional group, e.g., a hydroxyl, glycidyl, amino, carboxyl, mercapto, isocyanate, sulfone, or ester group as a functional group because these groups contribute to the reaction with the ceramic surface. A lubricant to be used is determined by the kind of ceramic material employed.

The thickness of the thin film is controlled so as to be uniform in the range of from 20 Å to 100 Å. This thin film comprises either a monomolecular film or a film which is several molecule thick. Since the size of a single molecule is of the order or 20 Å, a film having a thickness of 100 Å is composed of 5 molecular layers. It is impossible to coat a film having a thickness less than 20 Å, i.e., the thickness of a single molecule. The size of molecules varies according to the kind of lubricant, as a matter of course. The functional group portion of the lubricant strongly bonds to the ceramic surface mainly by chemisorption, so that separation of the lubricant by CSS is prevented. Thus, the lubricant protects the ceramic surface effectively. If the thickness of the thin film exceeds 100 Å, a sticking phenomenon based on the meniscus effect of the lubricant occurs, resulting in an increase in the starting resistance.

The antistatic agent used in the present invention is at least one selected from among surface-active agents and polyoxyethylene additives. Preferable examples are ester and amine type antistatic agents. Surface-active agents usable in the present invention are polyhydric alcohol esters of fatty acid having monoalkyl, dialkyl, glycerin, sorbitol, polyglycerin or polyoxyethylene as a lipophilic group. Polyoxyethylene additives usable in the present invention are those having alkylamine, alkylamide, fatty alcohol or alkylphenol as a lipophilic group.

Coating of an antistatic agent is effected by adding a small amount of antistatic agent to the above-described lubricant when coated.

By virtue of the arrangement of the present invention, in which a thin film with a thickness in the range of from 20 Å to 100 Å and having protecting and lubricating functions, which is formed from the above-described material, is provided on a sliding surface of a constituent member of the hydrodynamic bearing, the coefficient of static friction can be reduced to 0.2 or less. With regard to the durability, it has been revealed that there is no change in the coefficient of friction even after more than 40,000 cycles of CSS (Contact Start and Stop) test.

In addition, it has been confirmed that, since a ceramic material, which has superior wear resistance, is used, the sliding surfaces are undamaged even after 80,000 cycles of CSS test. Specific examples of the hydrodynamic bearing according to the present invention will be explained below.

According to the present invention, it is possible to provide a hydrodynamic bearing which has a small coefficient of static friction and excellent durability and which can be used in a clean environment without using an ordinary lubricating oil and without the need for a special device to prevent dust generated in the bearing from leaking out.

BEST MODE FOR CARRYING OUT THE INVENTION

Figure 1:
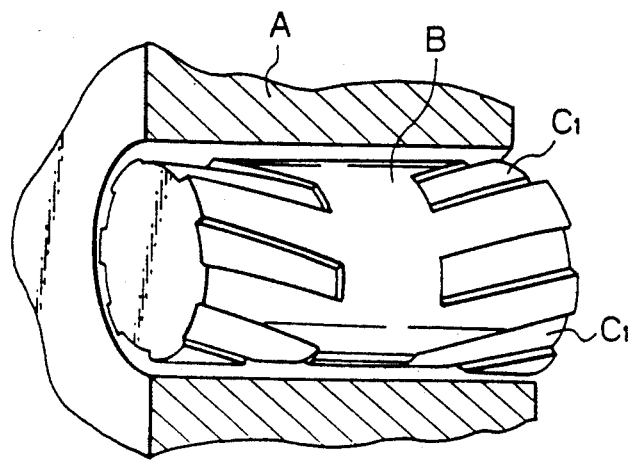
FIG. 1 is a fragmentary sectional view schematically showing the structure of a hydrodynamic radial bearing to which the present invention may be applied.

Referring to FIG. 1, which is a fragmentary sectional view schematically showing the structure of a hydrodynamic radial bearing to which the present invention may be applied, the surface of a movable or fixed member B of the bearing is formed with grooves for generating hydrodynamic pressure, e.g., herringbone-shaped grooves $C_1$.

Sliding surfaces are formed of a ceramic material with a surface roughness Ra not larger than 0.3 microns and provided with a thin film of lubricant having protecting and lubricating functions by thinly coating at least one lubricant selected from among perfluoropolyethers having a functional group reactive with the ceramic material. The thickness of the thin film is in the range of from 20 Å to 100 Å. Preferably, the lubricant contains an antistatic agent.

Examples of ceramic materials usable to constitute the sliding surfaces are those which are employed as engineering ceramics having high purity and denseness, such as alumina, mullite, diamond, SiC, TiN, $Si_3N_4$, TiC, glass, etc. The movable and fixed members of the bearing may be entirely or partially formed of a ceramic material such as those mentioned above. That is, only the sliding surfaces of these members may be coated with such a ceramic material. It is also possible to combine together these arrangements as desired to form a bearing.

In the hydrodynamic radial bearing shown in FIG. 1, when the movable member A and the fixed member B are rotated relative to each other, hydrodynamic pressure is generated in the gap between the members A and B.

Figure 2:
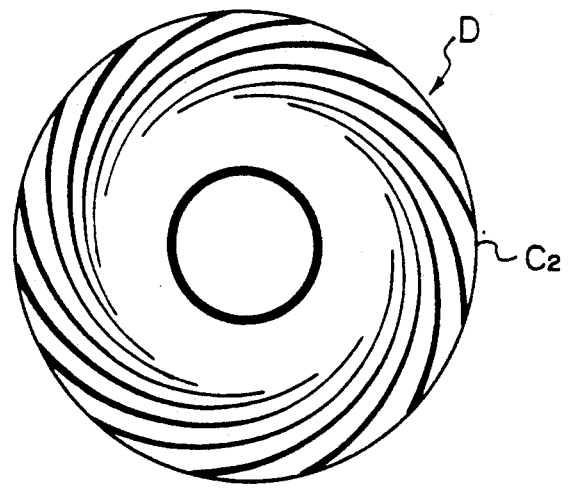
FIG. 2 is a plan view schematically showing spiral grooves of a hydrodynamic thrust bearing to which the present invention may be applied.

FIG. 2 is a plan view schematically showing spiral grooves of a hydrodynamic thrust bearing to which the present invention may be applied.

The surface of a fixed or movable member D of the thrust hydrodynamic bearing is formed with grooves for generating hydrodynamic pressure, e.g., spiral grooves $C_2$. In the same way as in the hydrodynamic radial bearing shown in FIG. 1, sliding surfaces are formed of a ceramic material with a surface roughness Ra not larger than 0.3 microns and provided with a thin film of lubricant having protecting and lubricating functions by thinly coating at least one lubricant selected from among perfluoropolyethers having a functional group reactive with the ceramic material. The thickness of the thin film is in the range of from 20 Å to 100 Å. Preferably, the lubricant contains an antistatic agent.

The ceramic material constituting the sliding surfaces and the structure thereof are the same as in the case of the hydrodynamic radial bearing shown in FIG. 1.

In the hydrodynamic thrust bearing shown in FIG. 1 also, when the movable member A and the fixed member B are rotated relative to each other, hydrodynamic pressure is generated in the gap between these members.

By virtue of the arrangement that a lubricant is coated on each sliding surface of the hydrodynamic bearing to provide a thin lubricant film, the coefficient of static friction of the bearing can be reduced to 0.2 or less. With regard to the durability, it has been revealed that there is no change in the coefficient of friction even after more than 80,000 cycles of CSS (Contact Start and Stop) test. It has also been confirmed that the sliding surfaces are undamaged.

EXAMPLE 1

Specific examples of the hydrodynamic bearing according to the present invention will be explained below.

Figure 3:
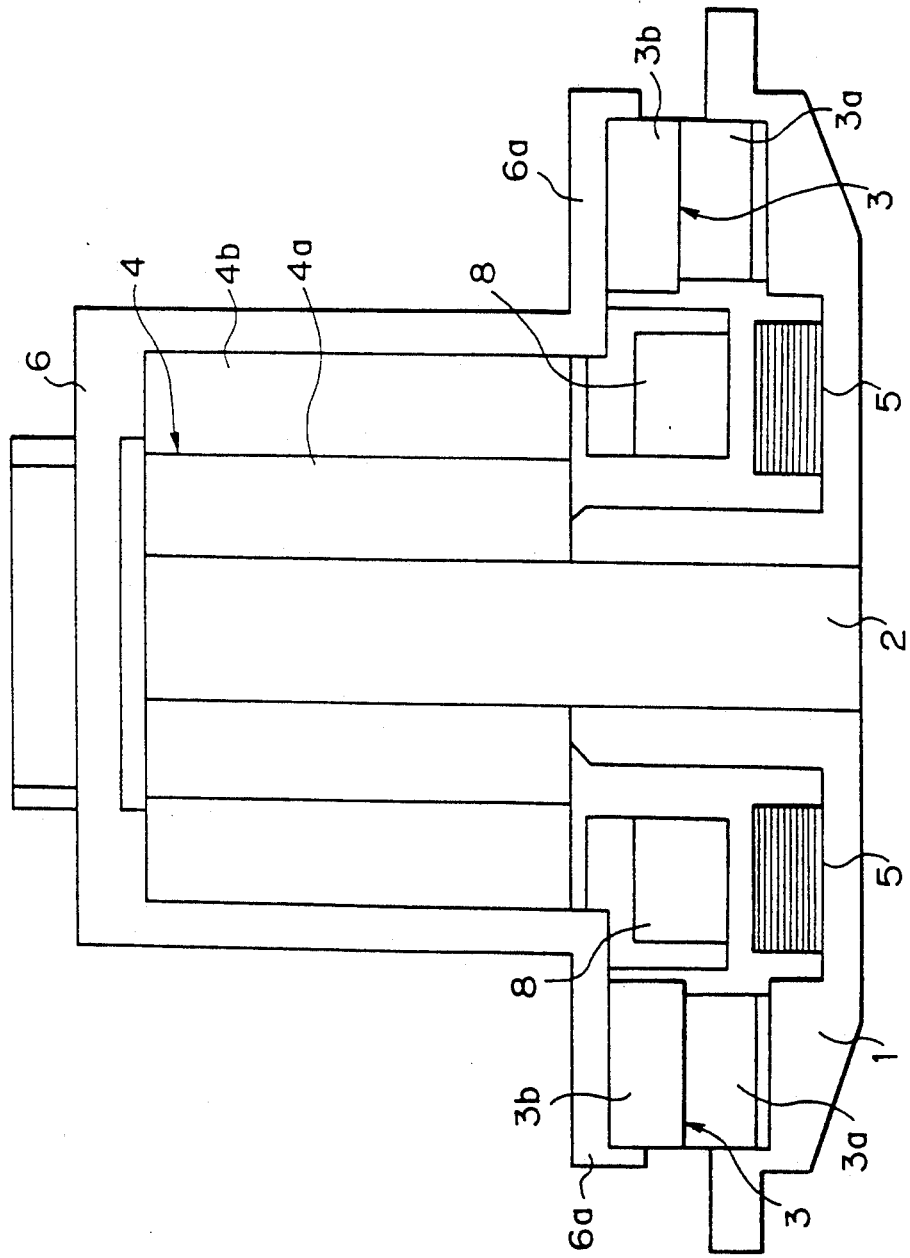
FIG. 3 is a sectional view showing the structure of a spindle motor that employs the hydrodynamic bearing according to the present invention.

FIG. 3 is a sectional side view of a spindle motor for an HDD (Hard Disk Drive) which employs the hydrodynamic bearing of the present invention as a bearing thereof. In FIG. 3, a base 1 has a support shaft 2 stood on the central portion thereof. A fixed member 4a of a radial bearing 4 is concentrically secured to the outer periphery of the support shaft 2. A cap-shaped motor rotor 6 has in the center a hole through which the support shaft 2 extends. The rotor 6 has at the lower end a collar portion 6a which extends horizontally.

A movable member 4b of the radial bearing 4 is secured to the inner peripheral surface of the support shaft receiving hole in the rotor 6 in concentric and opposing relation to the fixed member 4a. The movable member 4b and the fixed member 4a constitute in combination a radial bearing 4.

A movable member 3b of a thrust bearing 3 is secured to the bottom of the collar portion 6a of the motor rotor 6. A fixed member 3a is secured to the base 1 in opposing relation to the movable member 3b. The fixed member 3a and the movable member 3b constitute in combination a thrust bearing 3.

A rotor magnet group 8 is secured to the lower end of the motor rotor 6 at the inner side of the movable member 3b. A stator coil group 5 is secured to the base 1 in opposing relation to the rotor magnet group 8.

The motor rotor 6 is arranged such that hard disks can be mounted on the outer peripheral portion thereof.

The above-described spindle motor is a so-called thrust gap type spindle motor, in which the stator coil group 5 and the rotor magnet group 8 constitute a driving part of the spindle motor.

The surface of the fixed member 4a of the radial bearing 4 that faces the movable member 4b has herringbone-shaped grooves $C_1$ for generating dynamic pressure, such as those shown in FIG. 1, and the surface of the fixed member 3a of the thrust bearing 3 that faces the movable member 3b has spiral grooves $C_2$ for generating dynamic pressure, such as those shown in FIG. 2.

In the spindle motor having the above-described structure, as the stator coils 5 are supplied with an electric current, the motor rotor 6 having the rotor magnet group 8 secured thereto begins to rotate and consequently a hydrodynamic pressure is generated between the upper surface of the fixed member 3a of the thrust bearing 3 and the lower surface of the movable member 3b, thus forming a hydrodynamic thrust bearing. Similarly, a hydrodynamic pressure is generated between the outer peripheral surface of the fixed member 4a of the radial bearing 4 and the inner peripheral surface of the movable member 4b, thus forming a hydrodynamic radial bearing.

In this example, the material of the fixed and movable members constituting the bearings was SiC. The sliding portions of the fixed and movable members 3a and 3b of the thrust bearing 3 had a flatness not larger than 1 micron and a surface roughness Ra of 0.2 microns. The sliding surfaces of the fixed and movable members 4a and 4b of the radial bearing 4 had a cylindricality or roundness of 1 micron and a surface roughness Ra of 0.1 micron.

The bearing members were dipped in a lubricant solution prepared by dissolving 0.01 wt % of isocyanate-modified fluoropolyether polymer (FOMBLN-ZDISOC, manufactured by Nippon Montedison) represented by the following chemical formula in trichlorotrifluoroethane used as a solvent, and then dried by hot air for 1 hour at 120° C.:

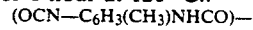

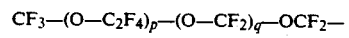

Figure 4:
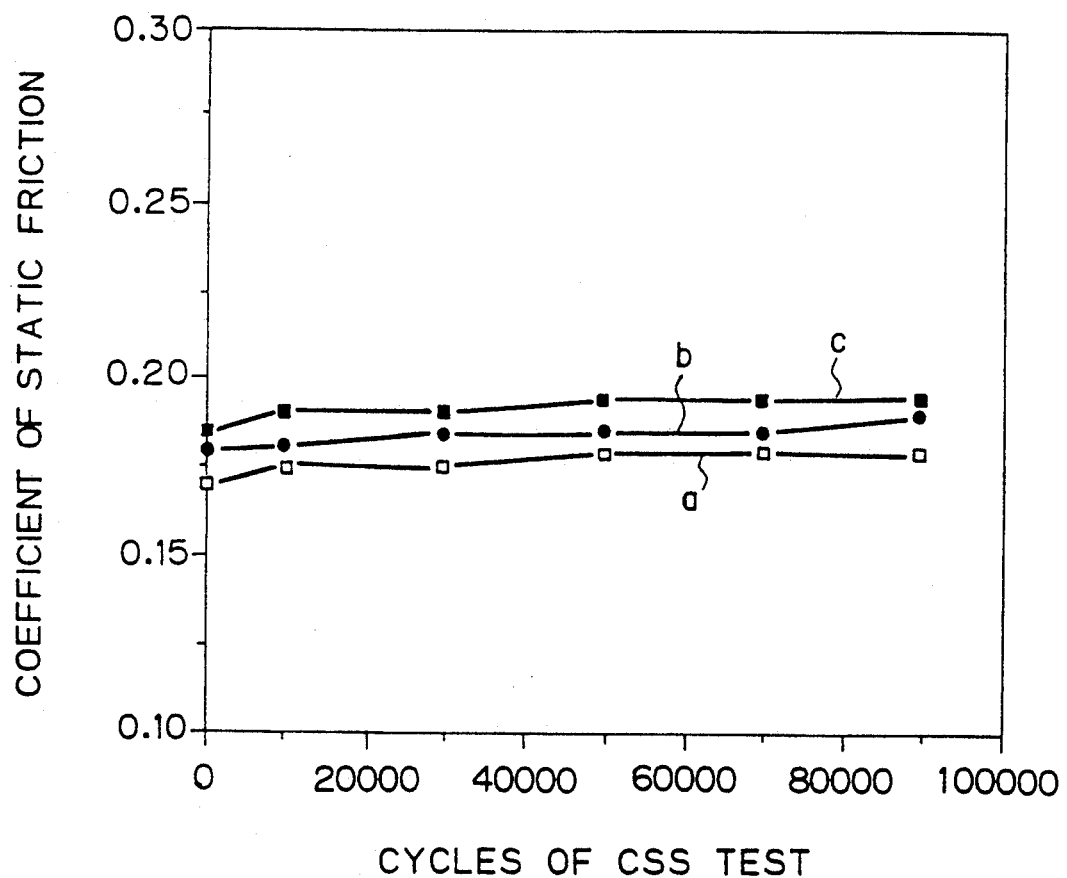
FIGS. 4, 5, 6 and 7 are graphs showing the results of CSS test.

At this time, a solid lublicant layer of about 100 Å was formed. The curve a in FIG. 4 shows the results of CSS test. Thus, no increase in the coefficient of friction was discerned even after 80,000 cycles of the CSS test.

EXAMPLE 2

The curve b in FIG. 4 shows the results of CSS test in Example 2.

Bearing members were formed in the same way as in Example 1 except that 99.7% alumina was employed as a material therefor. The bearing members were then coated with carboxyl group-containing perfluoroalkyl-polyether (KRYTOX157FS, manufactured by Du Pont) as a lubricant. The coating was carried out by dipping the bearing members in a 0.005 wt % solution of trichlorotrifluoroethane. Then, the coated bearing members were heat-treated for 30 minutes at 120° C. At this time, an oil film of about 50 Å was formed. The curve b in FIG. 4 shows the results of CSS test. Thus, no increase in the coefficient of friction was discerned even after 80,000 cycles of the CSS test.

EXAMPLE 3

The curve c in FIG. 4 shows the results of CSS test in Example 3.

Bearing members were formed in the same way as in Example 2 except that an aluminum material was employed and the sliding surfaces were subjected to ion plating with TiN. Then, the resulting product was tested. The curve c in FIG. 4 shows the results of CSS test. Thus, no increase in the coefficient of friction was discerned even after 80,000 cycles of the CSS test.

EXAMPLE 4

Figure 5:
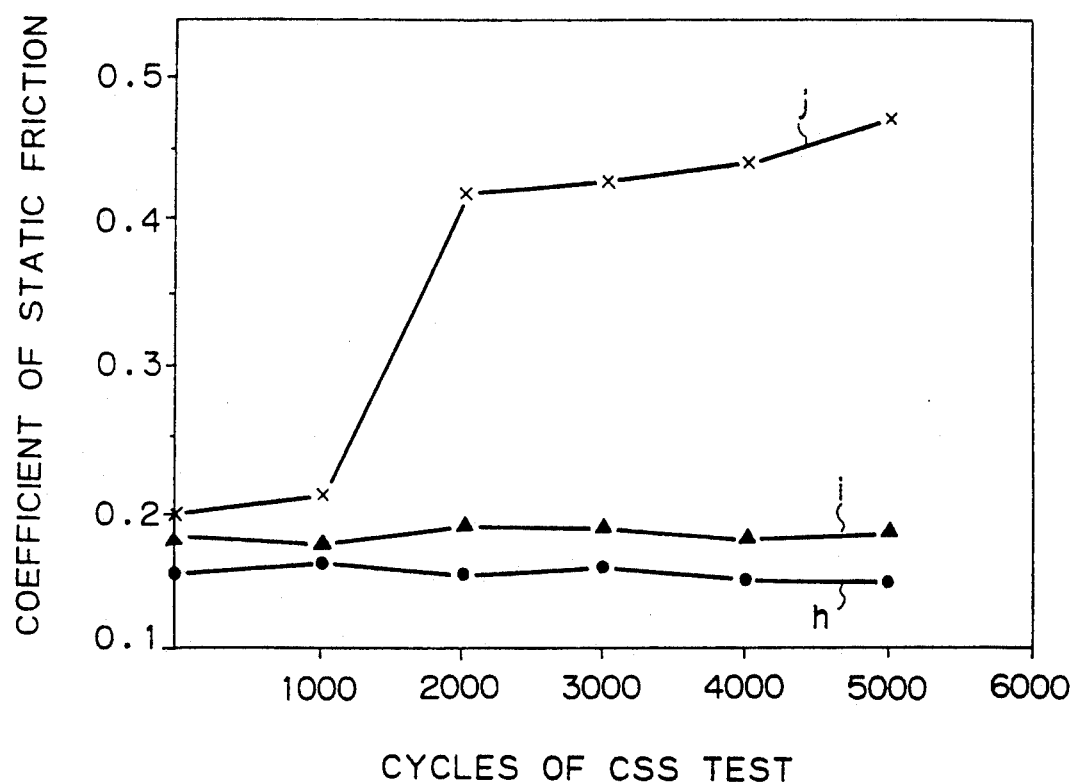

FIG. 5 shows the results of CSS test in Example 4 carried out under the same conditions as in Example 1 except for the surface roughness. The curves h, i and j in FIG. 5 show the results of tests carried out on bearing members in which the surface roughnesses Ra of both the thrust and radial bearings were 0.1 micron, 0.3 microns and 0.4 microns, respectively. As shown by the curves h and i, in the case where the surface roughnesses Ra of the bearing members were 0.1 micron and 0.3 microns, respectively, there was substantially no change in the coefficient of static friction. However, in the case where the surface roughness Ra was 0.4 microns, the coefficient of static friction increased rapidly at about 1,000 cycles and further increased gradually thereafter. The lubricant film was formed with a thickness of 100 Å.

EXAMPLE 5

Figure 6:
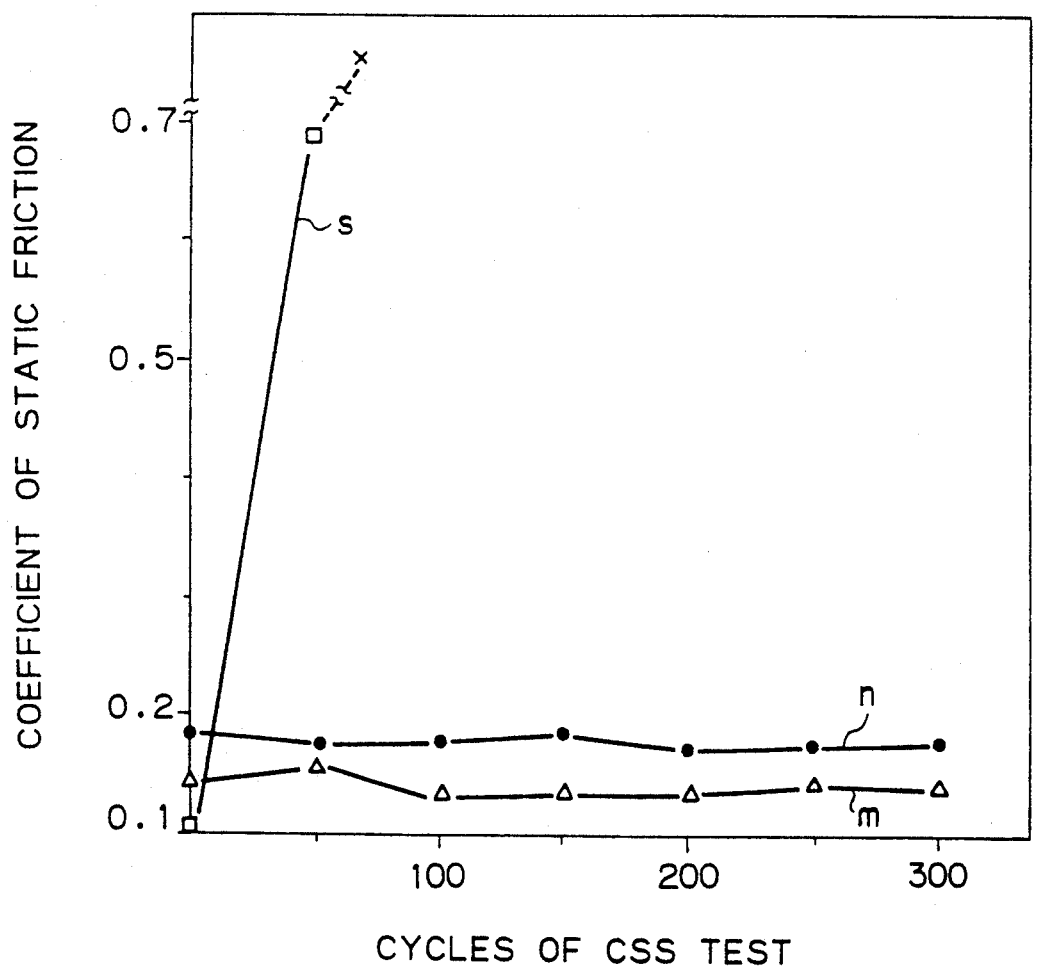

FIG. 6 shows the results of CSS test in Example 5 carried out under the same conditions as in Example 1 except for the thickness of the thin film. The curves m, n and s in FIG. 6 show the results of tests carried out on bearing members in which the thicknesses of the thin lubricant films were 50 Å, 100 Å and 120 Å, respectively. As shown by the curves m and n, in the case where the thin lubricant films were 50 Å and 100 Å in thickness, there was substantially no change in the coefficient of static friction. However, in the case where the thickness of the thin lubricant film was 150 Å, a sticking phenomenon occurred only at 100 cycles of the CSS test, so that it was impossible to measure the coefficient of static friction.

COMPARATIVE EXAMPLE 1

Figure 7:
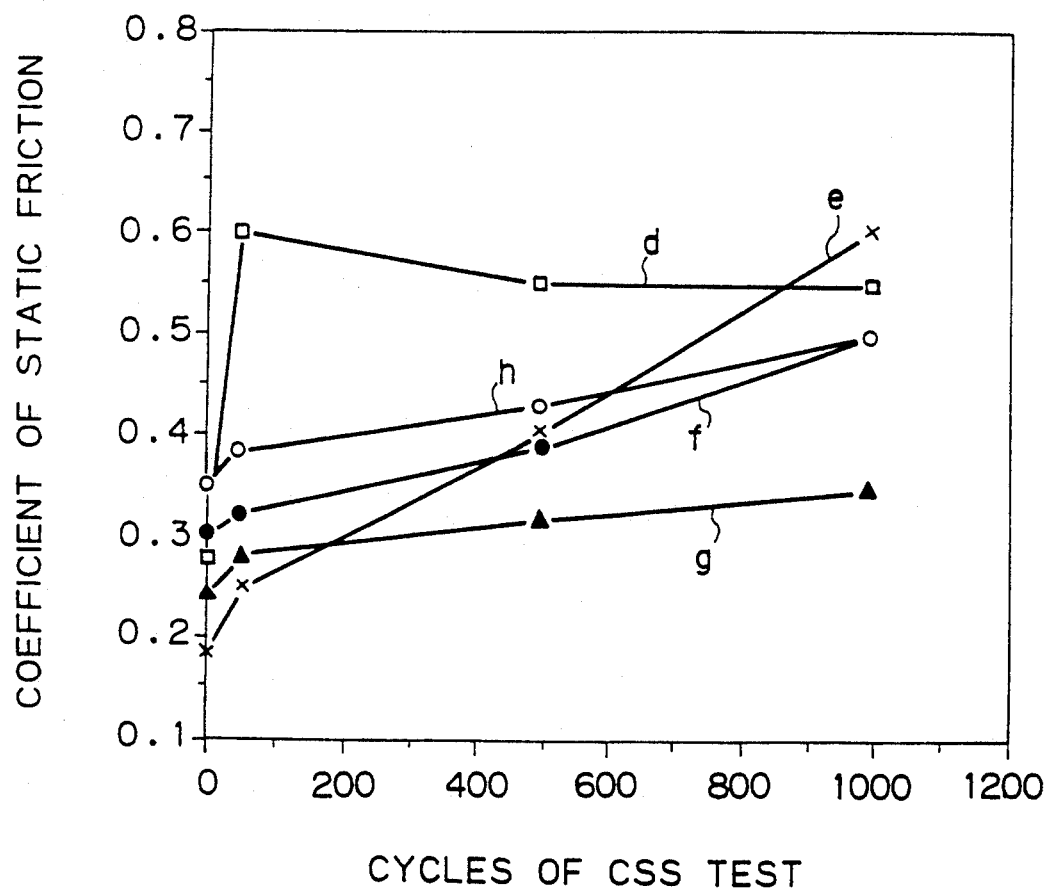

The curve d in FIG. 7 shows the results of CSS test in Comparative Example 1, in which the CSS test was carried out on bearing members produced under the same conditions as in Example 1 except that no lubricant was coated. In this case, an increase in the frictional resistance was found after about 50 cycles of the CSS test.

COMPARATIVE EXAMPLE 2

The curve e in FIG. 7 shows the results of CSS test of Comparative Example 2, in which the CSS test was carried out on bearing members produced under the same conditions as in Example 1 except that stainless steel SUS 303 was employed as a material and no hardwearing treatment was carried out. In this case, an increase in the coefficient of friction was found after about 500 cycles of the CSS test. In addition, a large number of sliding traces were observed on the sliding surfaces of the bearing.

COMPARATIVE EXAMPLE 3

The curves f, g and h in FIG. 7 show the results of CSS in Comparative Example 3, in which, under the same conditions as in Example 1, three different kinds of lubricant, that is, boron nitride, molybdenum disulfide, and graphite fluoride, were coated on the sliding surfaces. The coating of each lubricant was effected by covering the sliding surfaces of the bearing members with the lubricant powder and also covering the polishing cloth with the powder and then rubbing them with each other under pressure. The curves f, g and h in FIG. 7 show the results of tests carried out on the bearing members produced using boron nitride, molybdenum disulfide and graphite fluoride, respectively. As will be clear from the graph, it has been confirmed that the coefficient of friction increases as the number of times of the CSS test increases and it reaches 0.8 or more after about 3,000 cycles of the CSS test.

What is claimed is:

1. A hydrodynamic bearing comprising a sliding surface which is formed of a ceramic material with a surface roughness Ra not larger than 0.3 microns and coated with at least one lubricant selected from among perfluoropolyethers having a functional group reactive with said ceramic material, thereby providing on said sliding surface a uniform thin film with a thickness in the range of from 20 Å to 100 Å and having protecting and lubricating functions.

2. A hydrodynamic bearing according to claim 1, wherein said lubricant contains an antistatic agent.

3. A hydrodynamic bearing according to claim 2, wherein said antistatic agent is at least one surface-active agent selected from among polyhydric alcohol esters of fatty acid having monoalkyl, dialkyl, glycerin, sorbitol, polyglycerin or polyoxyethylene as a lipophilic group, or a polyoxyethylene additive having alkylamine, alkylamide, fatty alcohol or alkylphenol as a lipophilic group.

4. A hydrodynamic bearing according to claim 1, wherein said lubricant is selected from among hydroxyl group-containing perfluoropolyethers, carboxyl group-containing perfluoropolyethers, and ester group-containing perfluoropolyethers.

5. A hydrodynamic bearing according to claim 1, wherein said lubricant is coated in such a manner that a bearing member is first degreased and dried thoroughly and then dipped in said lubricant dissolved in a solvent, or said lubricant is attached to said sliding surface by spin coating or spray coating, and then said coated lubricant is heated to form a thin film.

6. A hydrodynamic bearing according to claim 1, wherein said perfluoropolyether lubricants having a functional group are polymers which have a principal structural unit represented by the general formula $-C_xF_{2x}-O-$ (X is an integer of 1 to 4) and an average molecular weight of 1,000 to 5,000.

* * * * *